United States Patent
Enzinna et al.

(10) Patent No.: US 6,657,406 B2
(45) Date of Patent: Dec. 2, 2003

(54) SOFT START CONTROL METHOD FOR A MOTOR-DRIVEN ACTUATOR

(75) Inventors: Donald John Enzinna, Lockport, NY (US); Mark Joseph Parisi, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 225 days.

(21) Appl. No.: 09/955,794

(22) Filed: Sep. 19, 2001

(65) Prior Publication Data

US 2003/0052630 A1 Mar. 20, 2003

(51) Int. Cl.7 .................................................. H02P 1/00
(52) U.S. Cl. .................. 318/280; 318/256; 318/282; 318/283; 318/284; 318/285; 318/286; 318/466; 318/467; 318/468; 318/469; 318/293; 318/626; 318/696; 318/10
(58) Field of Search ................................ 318/280, 282, 318/283, 432, 466–469, 10, 285, 286, 626, 293, 256, 696

(56) References Cited

U.S. PATENT DOCUMENTS

| | | | | |
|---|---|---|---|---|
| 4,134,052 A | * | 1/1979 | Wanlass | 318/282 |
| 4,364,111 A | * | 12/1982 | Jocz | 364/175 |
| 4,455,511 A | * | 6/1984 | Stewart | 318/9 |
| 4,467,250 A | * | 8/1984 | Thomasson | 318/436 |
| 4,591,868 A | * | 5/1986 | Cusey et al. | 343/903 |
| 4,912,380 A | * | 3/1990 | Zylstra et al. | 318/285 |
| 5,410,226 A | * | 4/1995 | Sekiguchi et al. | 318/266 |
| 5,634,676 A | * | 6/1997 | Feder | 292/201 |
| 5,650,698 A | * | 7/1997 | Ito et al. | 318/282 |
| 5,693,993 A | * | 12/1997 | Ito et al. | 310/68 B |
| 5,772,274 A | * | 6/1998 | Tokarz | 296/707 |
| 5,804,938 A | * | 9/1998 | Richmond et al. | 318/282 |
| 5,844,382 A | * | 12/1998 | Dan | 318/10 |
| 5,905,345 A | * | 5/1999 | Zimmer et al. | 318/4 |
| 6,075,298 A | * | 6/2000 | Maue et al. | 310/12 |
| 6,078,154 A | | 6/2000 | Manlove et al. | 318/293 |
| 6,107,759 A | * | 8/2000 | Miller | 318/4 |
| 6,111,378 A | * | 8/2000 | LeMay et al. | 318/443 |
| 6,112,583 A | * | 9/2000 | Yamamura | 73/116 |
| 6,297,606 B1 | * | 10/2001 | Yoshioka et al. | 318/467 |
| 6,320,342 B1 | * | 11/2001 | Yoshioka et al. | 318/467 |
| 6,424,109 B2 | * | 7/2002 | Ochiai et al. | 318/445 |

FOREIGN PATENT DOCUMENTS

JP  2000-324756  * 11/2000 ............ H02K/7/10

* cited by examiner

Primary Examiner—Robert E. Nappi
Assistant Examiner—Tyrone Smith
(74) Attorney, Agent, or Firm—Patrick M. Griffin

(57) ABSTRACT

A method of operation for a motor-driven worm gear actuator coupled to a load device energizes the motor in a series of pulses during an initial period of motor operation when reversal of the motor is commanded. The pulsed energization produces a slow initial axial movement of the motor armature without moving the load device, minimizing the contact force between the armature shaft and a mechanical end stop of the motor. Rotation of the motor is determined by identifying and counting motor current pulses due to commutation, and the pulse count is adjusted at each reversal of motor rotation to compensate for motor current pulses due to the pulsed energization.

4 Claims, 2 Drawing Sheets

_US 6,657,406 B2_

SOFT START CONTROL METHOD FOR A MOTOR-DRIVEN ACTUATOR

TECHNICAL FIELD

This invention relates to the control of a motor-driven actuator, and more particularly to a motor control for reducing audible noise due to armature shaft end-play.

BACKGROUND OF THE INVENTION

Control systems designed to position a load device frequently utilize an actuator coupled to a DC motor through a gear arrangement that provides a mechanical advantage. This is a common configuration because small permanent magnet DC motors may be produced at low cost, and actuator movement can be detected without position sensors by counting commutation pulses of the motor; see, for example, the U.S. Pat. No. 6,078,154 to Manlove et al., issued Jun. 20, 2000, and incorporated herein by reference. In many such systems, a worm gear is used to couple the armature of the motor to an output gear having an axis perpendicular to the armature; this is a popular arrangement because the worm gear can be formed or attached directly to the armature shaft, and because it provides a reasonably high mechanical advantage and virtually eliminates back-driving of the armature by the actuator. However, a drawback of this arrangement occurs due to axial shifting of the armature shaft each time the motor rotation is reversed. Mechanical stops are provided for limiting axial movement of the armature shaft, and clunking noises occur when the shaft forcibly impacts the stops. While the axial shifting and clunking noise can be virtually eliminated by minimizing the armature end-play, a certain amount of end-play is highly desirable from the standpoints of manufacturing cost and operating efficiency. Accordingly, what is needed is a way of minimizing the audible noise associated with axial shifting of the motor armature shaft while retaining the above-mentioned benefits of low cost and high efficiency.

SUMMARY OF THE INVENTION

The present invention is directed to an improved method of operation for a motor-driven actuator in which the motor is coupled to a load device through a worm gear on an armature shaft of the motor, wherein the motor is energized in a series of pulses during an initial period of motor operation when reversal of the motor is commanded. The pulsed energization produces a slow initial axial movement of the motor armature without moving the load device, minimizing the contact force between the armature shaft and a respective mechanical end stop of the motor. Rotation of the motor is determined by identifying and counting motor current pulses due to commutation, and the pulse count is adjusted at each reversal of the motor to compensate for motor current pulses caused by the pulsed energization.

DESCRIPTION OF THE PREFERRED EMBODIMENT

Figure 1:
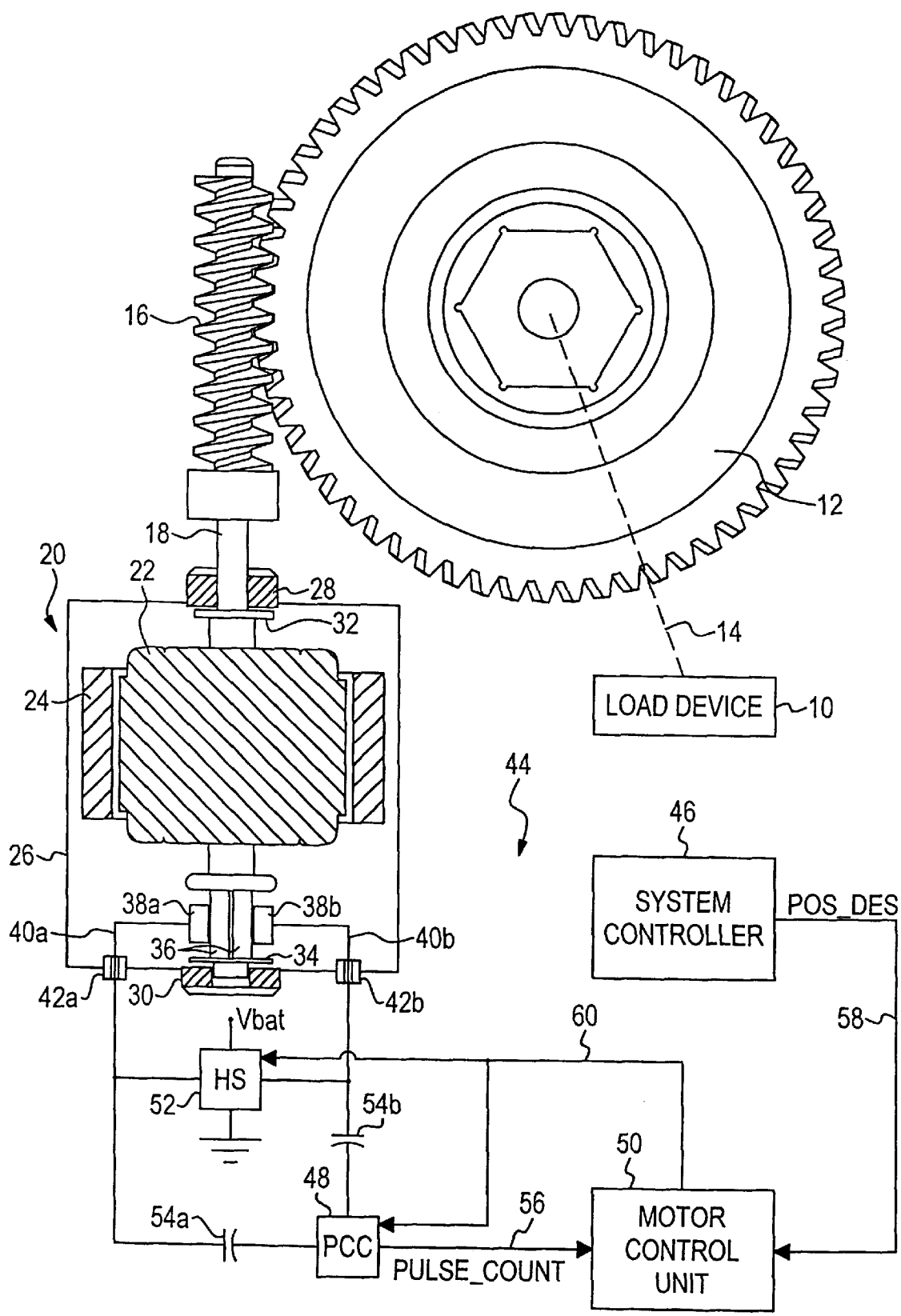
FIG. 1 is a diagram of a control system including a permanent magnet DC motor and worm gear drive arrangement, a pulse count circuit and a microprocessor-based motor control unit for carrying out the control method of this invention.

Referring to FIG. 1, the control method of invention is disclosed in the context of an automotive actuator control system for positioning a load device 10, which may be an air control door in an automatic climate control system, for example. The device 10 is mechanically coupled to an output gear 12, as indicated by the broken line 14, and the output gear 12 is maintained in meshing engagement with a worm gear 16 fastened to the armature shaft 18 of a permanent magnet DC motor 20. The armature shaft 18 carries a pole and winding assembly 22 disposed within a set of permanent magnets 24 attached to the inner periphery of the motor case 26, and the shaft 18 is radially constrained with respect to the motor case 26 by front and rear bushings 28 and 30. A pair of washers 32 and 34 disposed on the shaft 18 limit axial movement of the shaft 18 relative to the case 26 by virtue of contact with the respective bushings 28 and 30. This arrangement permits a limited axial movement of the shaft 18, which allows the shaft 18 to rotate freely within bushings 28 and 30 without binding. A number of commutator segments 36 coupled to the armature windings are affixed to the shaft 18 between the pole and winding assembly 22 and the rear washer 34, and a pair of brushes 38a, 38b bonded to conductors 40a, 40b contact opposing commutator segments 36. The conductors 40a, 40b pass through grommets 42a, 42b disposed in the motor case, permitting activation of motor 20 by a motor control circuit, generally designated by the reference numeral 44.

The motor control circuit 44 includes a system controller 46, a pulse count circuit (PCC) 48, a microprocessor-based motor control unit 50, and a motor drive circuit such as H-Switch (HS) 52. The pulse count circuit 48, which may be of the type described in the aforementioned U.S. Pat. No. 6,078,154 to Manlove et al., is capacitively coupled to the conductors 40a, 40b via capacitors 54a, 54b, and develops a PULSE_COUNT output on line 56 representative of a displacement of armature shaft 18, and hence, device 10. In general, the pulse count circuit 48 identifies and counts motor current pulses associated with commutation of the motor current to produce the output PULSE_COUNT. The system controller 46 develops a motor position command POS_DES on line 58, and the motor control unit 50 activates the H-Switch 52 via line 60 to bring the detected motor position into correspondence with POS_DES. Of course, the control is bi-directional—when the motor 20 needs to be driven in the forward direction, the motor control unit 50 activates H-Switch 52 to couple conductors 40a and 40b to battery voltage Vbat and ground, respectively, and vice-versa when the motor 20 needs to be driven in the reverse direction. Thus, the control signal on line 60 is also provided as an input to pulse count circuit 48 so that the identified commutation pulses increase PULSE_COUNT when the motor 20 is activated in the forward direction, and decrease PULSE_COUNT when the motor 20 is activated in the reverse direction.

Figure 2:
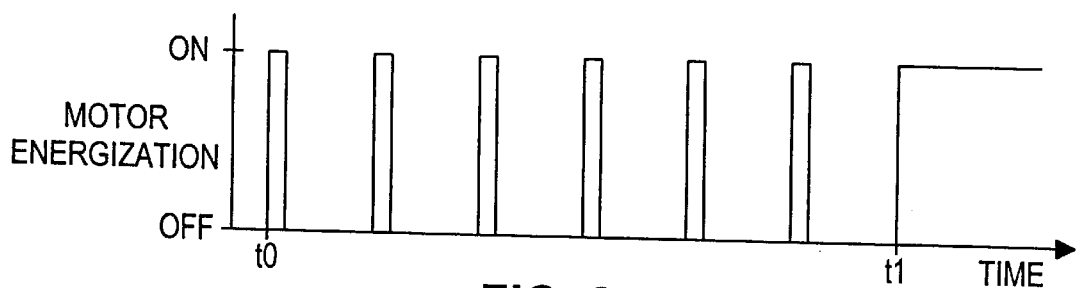
FIG. 2 is a graph depicting a portion of the motor control carried out by the control unit of FIG. 1.

As explained above, a problem with the mechanical arrangement disclosed in FIG. 1 is that the motor armature shaft 18 shifts axially when the direction of motor rotation is reversed, producing audible noise as the front or rear washers 32, 34 forcibly contact the respective bushings 28, 30, which act as end-stops for the armature 18. According to the present invention, the motor control unit 50 uses pulse-width-modulation (PWM) to slowly initiate motor rotation each time the direction of motor rotation needs to be reversed, and then compensates the PULSE_COUNT output of pulse count circuit 48 for the effect of motor current pulses caused by the PWM. FIG. 2 graphically depicts the initial modulation of the motor energization according to a preferred embodiment this invention, where the motor windings are energized in a series of low duty cycle pulses in the time interval t0–t1 prior to full energization of the motor windings. In a particular mechanization of this invention, for example, the motor energization signal was pulsed for six periods of PWM at a frequency of approximately 100 Hz, and a PWM duty cycle of approximately 12%. Obviously, various other PWM periods and duty cycles can be used, depending on the application. In general, however, the PWM duty cycle is chosen to produce sufficient torque to take up the mechanical lash of the actuator without moving the device 10. The number of pulses is chosen to permit sufficient time for the initial armature movement, and the PWM frequency is chosen to prevent objectionable audible noise.

Figure 3:
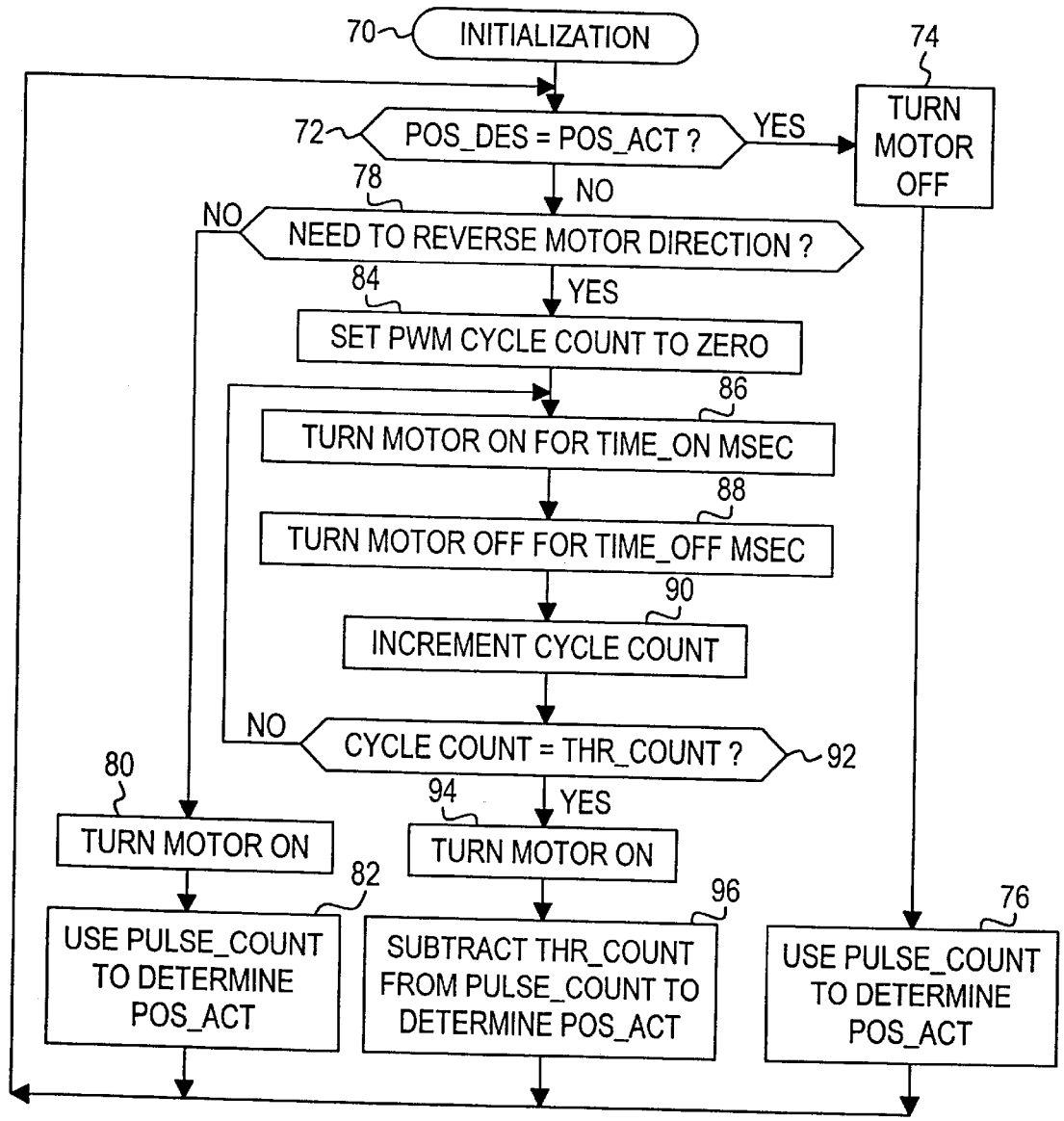
FIG. 3 is a flow diagram representative of a software routine executed by the control unit of FIG. 1 according to this invention.

FIG. 3 depicts a flow diagram of a software routine executed by motor control unit 50 for carrying out the above-described control. The reference numeral 70 designates a series of initialization instructions for setting various parameters and variables to predefined values, and for initializing the PULSE_COUNT output of pulse count circuit 56 by driving the motor 20 to a limit position of device 10, for example, and then setting PULSE_COUNT to a corresponding value. The variables initialized at block 70 include an actual motor position term POS_ACT, which is typically initialized at the initial PULSE_COUNT value. Following initialization, the block 72 is executed to determine if POS_DES is equal to POS_ACT. If so, blocks 74 are 76 are executed to turn off motor 20, and to set POS_ACT based on the PULSE_COUNT output of pulse count circuit 48, whereafter block 72 is re executed as shown. If block 72 is answered in the negative, the block 78 determines if the motor 20 needs to be reversed relative to the previous direction of motor rotation. If not, significant axial shifting of the armature shaft 18 is not expected; in this case, the blocks 80 and 82 are executed to turn the motor 20 fully on and to set POS_ACT based on the PULSE_COUNT output of pulse count circuit 48, whereafter block 72 is re-executed as shown. If block 78 is answered in the affirmative, axial shifting of the armature shaft 18 is expected to occur, and the blocks 84–92 are executed to effect a low duty-cycle PWM energization of the motor windings, which allows the armature shaft 18 to slowly shift axially, moving the front or rear washer 32, 34 into engagement with the respective bushing 28, 30, as the worm gear 16 begins to exert torque on output gear 12. The block 84 sets a PWM cycle counter to zero, the block 86 turns the motor on for a predetermined interval (TIME_ON), the block 88 turns the motor off for predetermined interval (TIME_OFF), and the block 90 increments the cycle counter. Block 92 compares the cycle counter to a threshold count THR_COUNT, and directs the re-execution of blocks 86–90 until the cycle counter has been incremented to THR_COUNT. At such point, the block 94 turns the motor 20 fully on, and the block 96 updates the variable POS_ACT by subtracting the predetermined number of PWM pulses (THR_COUNT) from the PULSE_COUNT output of pulse count circuit 48, whereafter block 72 is re-executed as shown.

In summary, the control of the present invention selectively utilizes PWM of the motor energization to eliminate audible noise due to axial shifting of the armature shaft 18 while retaining the cost and performance advantages associated with high motor efficiency and pulse count motor position feedback. While the present invention has been described in reference to the illustrated embodiment, it is expected that various modifications in addition to those mentioned above will occur to those skilled in the art. For example, the PWM frequency developed by motor control unit 50 may be higher than the highest expected commutation pulse frequency, so that the pulse count circuit 48 or an auxiliary circuit can filter out or otherwise ignore the corresponding motor current pulses. Thus, it will be understood that control methods incorporating these and other modifications may fall within the scope of this invention, which is defined by the appended claims.

What is claimed is:

1. A method of operation for an actuator that positions a load device in accordance with a position command, the actuator including a reversible electric motor having a rotary armature shaft and a gear arrangement including a worm gear disposed on and driven by the armature shaft for coupling the armature shaft to the load device, wherein the armature shaft shifts axially into engagement with armature end stops when a direction of armature rotation is reversed, the method comprising the steps of:

detecting a commanded reversal of armature shaft rotation;

when a commanded reversal of armature shaft rotation is detected, energizing said motor in a series of pulses sufficient to move said armature shaft axially into engagement with a respective armature end stop without moving said load device; and thereafter fully energizing said motor to move said load device in accordance with the position command.

2. The method of operation of claim 1, including the step of:

detecting rotation of said armature shaft by identifying and counting motor current pulses such that the detected rotation is insensitive to motor current pulses caused by said series of pulses.

3. The method of operation of claim 1, including the steps of:

turning said motor on and off for predefined on-time and off-time intervals when the commanded reversal of armature shaft rotation is detected; and fully energizing said motor after a predetermined number of said on-time and off-time intervals.

4. The method of operation of claim 3, including the steps of:

counting said motor current pulses to form a pulse count; and reducing said pulse count by said predetermined number to compensate said pulse count for motor current pulses caused by turning said motor on and off.

* * * * *